United States Patent [19]

Quick

[11] 4,276,591

[45] Jun. 30, 1981

[54] PROGRAMMABLE POWER REGULATING POWER SUPPLY

[75] Inventor: Donald L. Quick, Mountain View, Calif.

[73] Assignee: The Perkin-Elmer Corporation, Norwalk, Conn.

[21] Appl. No.: 43,518

[22] Filed: May 29, 1979

[51] Int. Cl.³ .................................... H02P 13/26

[52] U.S. Cl. .................................... 363/92; 363/53; 323/254; 361/79

[58] Field of Search .................... 363/50, 52, 53, 84, 363/87-89, 92-93; 323/6, 7, 9, 17, 89 A, 89 P; 340/660, 661, 662, 663, 664; 361/18, 79, 86, 87

[56] References Cited

U.S. PATENT DOCUMENTS

| | | | |
|---|---|---|---|
| 3,013,199 | 12/1961 | Hollingsworth, Jr. et al. | 363/82 |
| 3,042,848 | 7/1962 | Muchnick et al. | 363/90 |
| 3,122,694 | 2/1964 | Muchnick et al. | 323/89 P |
| 3,969,635 | 7/1976 | Wilke | 340/662 |
| 3,976,931 | 8/1976 | Sterling | 363/90 |
| 4,103,324 | 7/1978 | Vandervelden et al. | 323/17 X |

*Primary Examiner*—William M. Shoop
*Assistant Examiner*—Peter S. Wong
*Attorney, Agent, or Firm*—S. A. Giarratana; E. T. Grimes; T. P. Murphy

[57] ABSTRACT

A high power D.C. supply regulated for constant output power to be dissipated in varying loads such as encountered in cathode sputtering systems. A.C. input power is rectified to produce the desired D.C. The output D.C. voltage and load current are measured and a voltage signal proportional to their product is compared with a D.C. input control signal. The comparator "error" output signal controls a pass element that varies a D.C. current through saturable reactors in the A.C. input power lines to regulate the D.C. power into the load. The supply includes a limiting feature that is adjustable to a desired threshold level for limiting D.C. output power, voltage, and/or current so that the limiter will take control from the comparator to hold the supply output at a safe level.

11 Claims, 1 Drawing Figure

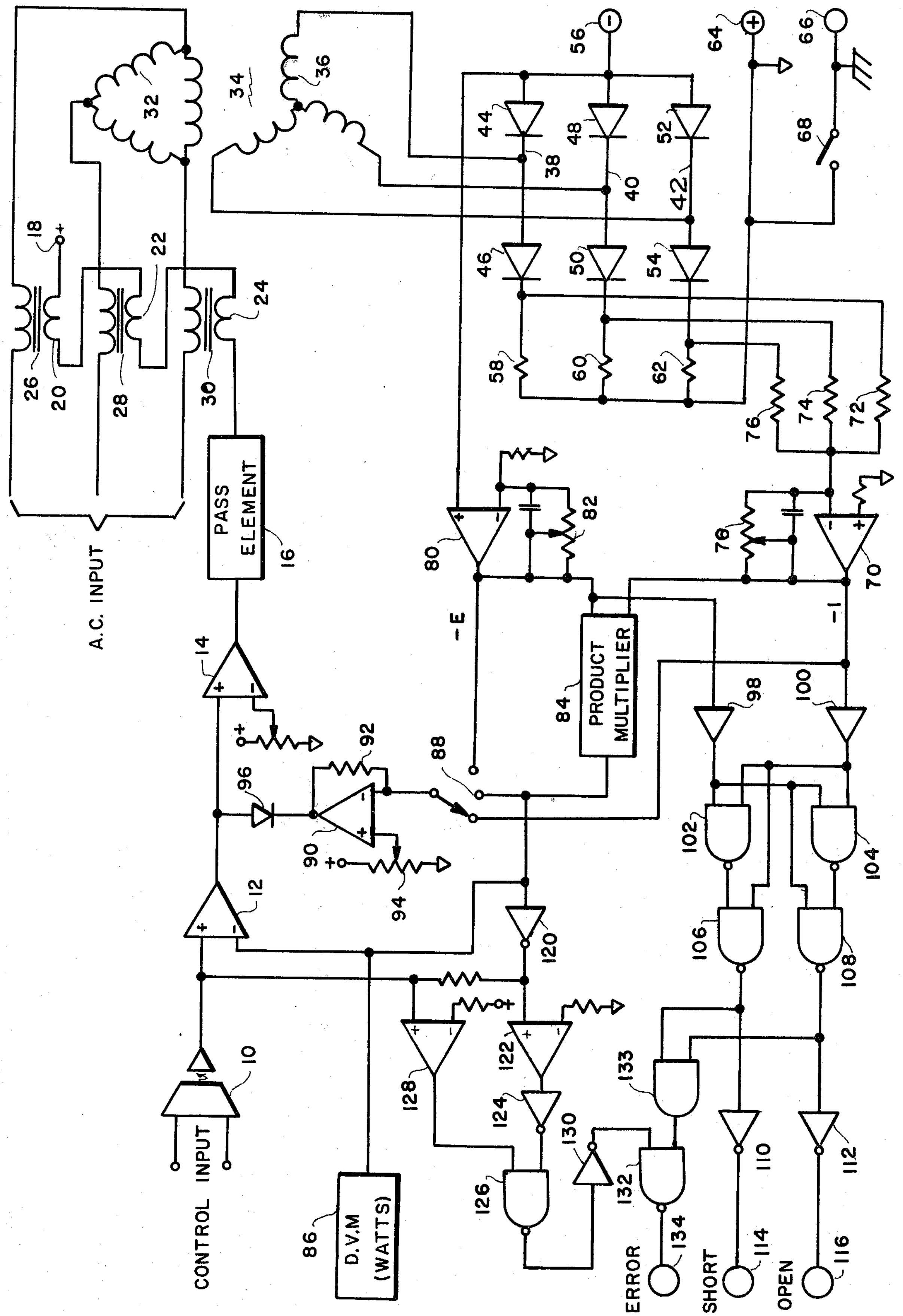
A.C. INPUT
PASS ELEMENT
PRODUCT MULTIPLIER
-E
-I
CONTROL INPUT
D.V.M (WATTS)
ERROR
SHORT
OPEN

PROGRAMMABLE POWER REGULATING POWER SUPPLY

CROSS-REFERENCE TO RELATED APPLICATIONS

The invention disclosed in the present application includes a novel D.C. wattmeter which receives and scales D.C. signals representing the measured voltage to, and current through a load and multiplies these two values to obtain a product voltage proportional to the dissipated D.C. power. This wattmeter is separately disclosed and claimed in this applicant's copending application, Ser. No. 035,191 and filed May 2, 1979.

BRIEF SUMMARY OF THE INVENTION

This invention relates to regulated power supplies and particularly to a novel regulated D.C. power supply that generates into varying loads a constant D.C. power, the level of which is selected by an externally applied input control signal.

Regulated power supplies are generally designed to generate a constant output voltage and/or constant current regardless of varying input voltages or varying load conditions. In many instances, however, it is desired to dissipate a constant power level into a load with varying impedances such as may be encountered, for example, in plasma generation in D.C. sputtering systems.

A power supply that is power regulated would obviously require some means for measuring output power into a load for generating a control signal that operates to appropriately vary and regulate the output power. If the load is of a constant impedance, this may be very simply done by the use of the aforementioned voltage regulation; however, serious difficulties are encountered if the load is variable over a wide impedance range. For example, if the load impedance became excessively high or an open circuit, the load current would drop or become zero and the power regulated supply would then attempt to generate excessively high voltages in order to achieve the required volt-ampere product. Conversely, if the load became short-circuited, the supply would attempt to generate infinite current in an attempt to raise the output voltage to a level sufficiently high to produce the required output power. Thus, a power regulated supply, under these extreme conditions, may attempt to produce the volt-ampere product at an extremely high voltage at nearly zero current, or at an extremely high current at near zero voltage. In either of these cases, severe damage may result to the supply or to the load.

The power supply disclosed herein is an output power regulated supply that not only has provisions for limiting output power, output current, and output voltage, but also provides means for controlling the level of the feedback regulated output power from an external control signal source, such as a computer or manual adjustment.

Briefly described, the power supply of the invention includes circuitry that measures both the rectified D.C. load voltage and current and generates corresponding voltage signals that are combined in a product multiplier to obtain a product voltage proportional to the D.C. output power. This product voltage is compared with an externally supplied D.C. control signal representing the desired power output. The comparator output signal controls a pass element that varies the saturation current in saturable reactors in the A.C. power input lines to the rectifier circuitry. The power supply includes a limiter circuit responsive to either the voltage signals corresponding to the measured load voltage, load current, or product voltage, which is calibrated to a desired threshold voltage level. When the power, voltage, and/or current exceeds a desired threshold level, the limiter takes control of the pass element, bypassing the comparator, and the output of the power supply is thus maintained at a safe predetermined level.

DESCRIPTION OF THE DRAWING

The single drawing is a block diagram of the preferred embodiment of the programmable power regulating D.C. power supply employing three-phase A.C. input power.

DETAILED DESCRIPTION OF THE PREFERRED EMBODIMENT

The power regulated output of the power supply is governed by a D.C. input signal and may be derived by a manual D.C. control, microprocessor, or any other device that provides the necessary control signal. Since it may be desirable to operate the power supply output terminals at some D.C. level above or below chassis ground reference, the D.C. input control signal is applied to a linear optoisolator 10 which produces a corresponding D.C. output signal that is applied to the non-inverting input of a comparator 12. Comparator 12 may be the popular Model 741 OP AMP and it will be noted that the conventional feedback resistance between the output terminal and one input terminal has been omitted. In the preferred embodiment, a capacitance feedback is provided and includes a large capacitance, in the order of 20 mfd (not shown) that provides frequency roll-off. Other feedback is provided by the associated circuitry yet to be described. By necessity, the comparator 12 must not use linear D.C. feedback directly from its output to input.

The output of the comparator 12 is applied to the non-inverting input terminal of a power amplifier 14, the inverting input of which is coupled to a reference voltage. As with the comparator 12, the amplifier 14 may also be the type 741.

The output of the power amplifier 14 is applied to a pass element 16 of sufficient capacity to appropriately vary a direct current from between zero and approximately four amperes at a potential of approximately sixty volts that is derived from a D.C. input terminal 18.

The D.C. applied to terminal 18 passes through the control windings 20, 22 and 24 of three saturable reactors 26, 28 and 30, respectively, and into the pass element 16 where the current through the control windings is varied and regulated as will be described later. The saturable reactors 26, 28 and 30 are coupled in series with each conductor of a three-phase A.C. input power signal that is applied to the primary windings 32 of a delta-wye power transformer 34. One each of each of the three-phase secondary windings 36 is coupled together and the other ends of the windings are connected to conductors 38, 40 and 42 in the rectifying circuit. Conductor 38 is coupled to the cathode of a diode 44 and to the anode of a diode 46. Conductor 40 is coupled to the cathode of a diode 48 and to the anode of a diode 50. Conductor 42 is coupled to the cathode of a diode 52 and the anode of a diode 54. The anodes of diodes 44, 48 and 52 are coupled together and to the negative output terminal 56 of the regulated power supply.

The cathodes of the diodes 46, 50 and 54 are coupled through three identical series resistances 58, 60 and 62, respectively, to a common junction that is coupled to the positive output return terminal 64 of the power supply.

The power supply described herein was developed primarily for applying a negative potential constant power such as required for plasma generation in a D.C. cathode sputtering system, hence the positive output terminal 64 of the supply is normally above chassis ground potential. Most sputtering applications require operating the supply at some bias voltage above ground reference. The positive output return terminal 64 may be connected to the chassis ground terminal 66 through an appropriate strapping system or switch 68, when it is desirable to use the system as a conventionally connected power supply.

The external load is normally applied across terminals 56, 64 and 66. The total load current is passed through the resistors 58, 60 or 62. These resistors preferably have a value of approximately one ohm and the voltage drop across them is measured by an operational summing amplifier 70, the non-inverting input terminal of which is grounded and the inverting input terminal of which receives a signal proportional to the total current through the load. Thus, the cathode of diode 46 is coupled to a resistance 72; the cathode of diode 50 is coupled to a resistor 74; and the cathode of diode 54 is coupled to a resistor 76. Resistors 72, 74 and 76 are substantially equal in value at approximately fifty kilohms, and their opposite terminals are connected together and to the inverting input of the summing amplifier 70. Amplifier 70 is provided with a feedback resistance in the form of a potentiometer 78 of approximately 25 kilohms which permits the amplifier 70 to be accurately adjusted as will be determined later. The output signal from the amplifier 70 is a voltage signal proportional to the total load current.

A voltage signal proportional to the load voltage is obtained by a second amplifier 80, the non-inverting input of which is coupled to the high voltage output terminal 56. As with the amplifier 70, amplifier 80 is provided with feedback in the form of a 25 kilohm potentiometer 82 which permits gain adjustment of the amplifier. The signal at the output terminal of amplifier 80 is therefore a voltage signal proportional to the output voltage at terminal 56.

The signal representing voltage level produced by the scaling amplifier 80 and the signal representing load current produced by the scaled summing amplifier 70 are combined in a product multiplier 84, such as the type AD534 produced by Analog Device Corporation of Norwood, Mass. The output signal from the multiplier 84 is a voltage signal representing the product of output voltage and output current and is therefore proportional to the total D.C. power dissipated in the external load. This voltage signal from the multiplier 84 may be read directly by a precision meter, such as the digital voltmeter 86.

The output of the product multiplier 84 is applied to the inverting input terminal of the comparator 12 so that the voltage signal representing dissipated power may be compared with the input control signal from the opto-isolator 10. It is apparent, therefore, that the system thus far described comprises a servo system in which the comparator 12 generates an "error" voltage, representing differences between the control input and the power multiplier output, and adjusts the pass element 16 that controls the input power and hence the output power of the power supply. The supply, therefore, is power-regulated.

A serious difficulty with power regulated power supplies is that the regulation circuitry does not recognize a shorted or open load circuit. For example, in the event of an inadvertent open circuit, the current summing amplifier 70 would produce a zero output. The product multiplier 84 will also produce a zero output and the comparator 12 would then produce an output signal which would attempt to force the output voltage to climb to its highest available level. Similarly, a load short circuit would increase the current signal from the summing amplifier 70 to a very high level and reduce the output of the voltage scaler amplifier 80 to zero.

The power regulation circuitry herein includes means for limiting output voltage, current, or power, for preventing inadvertent damage to the equipment. The output from the scaled output voltage amplifier 80, the scaled load current summing amplifier 70, and the product multiplier 84 are each coupled to a terminal of a three-position switch 88, the selecting terminal of which is connected to the input terminal of a limiter 90. The limiter 90 may be the popular type 741 OP AMP with a suitable feedback resistance 92, typically 100 kilohms, and with its second input coupled to the arm of a potentiometer 94 connected between a positive D.C. reference voltage and circuit common. The potentiometer 94 thus provides a threshold voltage level which may be preset to be compared with the voltage signals representing output voltage, load current, or dissipated power.

The output of limiter 90 is coupled to the cathode of a diode 96, the anode of which is connected to the input of the power amplifier 14. Thus, as long as the signal to the input of limiter 90 is lower in value than the threshold level established by the potentiometer 94, the output of the limiter will be positive, thereby reverse biasing the diode 96 and effectively disconnecting the limiter circuit from the input of the power amplifier 14. However, whenever the selected supply output power, load current, or output voltage exceeds its predetermined threshold level, the output of limiter 90 will go to a negative level thereby forward biasing the diode 96. The limiter 90 now overrides the error signal from the comparator 12 and applies its negative-going output to the input of amplifier 14. Whenever the load problem has been corrected and the input signal to limiter 90 drops below the threshold level, the diode 96 will again disconnect the limiter from the circuit and the comparator 12 will again control the power output of the supply. During limiting, a feedback loop around the system is formed and controlled by the limiter amplifier 90.

While the limiter 90 is illustrated as a single component with its input connected to switch 88 for selecting either power, voltage or current input signals, it is clear that the switch 88 may be omitted and the three input signals applied directly to three separate limiters 90 each having its own adjustable threshold potentiometer 94 and reverse biased diode 96. Such a parallel limiter configuration provides full control of the supply and assures additional degrees of safety to the load as well as for the power supply components.

A short or open load condition may be made to signal an audible or visual alarm by a logic network coupled to the output of the scaled voltage amplifier 80 and the current summing amplifier 70. The output of amplifier 80 is applied to an amplifier 98 which converts the analog signals into digital levels and the output of amplifier 70 is applied to the amplifier 100 which converts the analog signals into digital levels. The output of amplifiers 98 and 100 are applied to the two input terminals of a NAND gate 102 and also to a second NAND gate 104. The output of NAND gate 102 is applied to a NAND gate 106 which receives its second input from the output of amplifier 100. Similarly, the output of NAND gate 104 is applied to a NAND gate 108 which receives its second input from the output of amplifier 98. The output signals from NAND gates 106 and 108 are applied to inverters 110 and 112, respectively, and the outputs therefrom may actuate the desired alarms, such as the indicators 114 and 116, respectively. If both the scaler amplifiers 70 and 80 are generating output signals, both the "short" and "open" indicators will remain off. However, if, for example, there is an open load circuit, the load current will drop to zero and the output of the summing amplifier 70 will likewise become zero. The logic network will then actuate the indicator 116 to indicate an open load circuit. In a similar manner, a shorted load will produce a binary "0" from the amplifier 98 and a binary "1" from the amplifier 100 and the logic circuit will actuate the indicator 114 to alert the operator to a short circuit condition.

The supply also indicates circuitry that will signal an "error" whenever the output power is not at the programmed level applied to the control input. The output of the product multiplier 84 is inverted at inverter 120 and compared with the control input signal from the output of the linear opto-isolator 10. The difference voltage, if any, is amplified by amplifier 122, inverted and applied to NOR gate 126. A second input to gate 126 is received from amplifier 128 which receives its inputs from the output of the opto-isolator 10 and a reference voltage. Amplifier 128 therefore produces an output whenever there is a programmed input signal to the supply, and amplifier 122 produces an output if the power output of the supply does not conform to the level of the programmed input signal.

The output of NOR gate 126 is inverted at 130 and applied to an input of NOR gate 132, the second input to which is received from AND gate 133. AND gate 133 receives its two inputs from the NOR gates 106 and 108, each of which produce a binary "1" in the absence of a "short" or "open". Therefore, if there is neither a short nor open output circuit condition and if there is a programmed control input, and the output power conforms to that input, the "error" indicator 134 will remain off. A failure of any one of these conditions will turn on the error indicator 134.

What is claimed is:

1. A power supply for generating a constant regulated power output at a level proportional to the level of an applied input control signal, said power supply comprising:

power circuitry including A.C. power input circuitry, rectification circuitry, and D.C. power output circuitry;

power measuring means coupled to said power circuitry for generating an output voltage signal proportional to the D.C. output power of the power supply;

control input circuitry responsive to external control and providing a control signal level proportional to the desired power output of said power supply;

signal comparison circuitry coupled to said power measuring means and to said control input circuitry for measuring an error signal proportional to the difference between said output power voltage signal and said control level signal;

A.C. power controlling means coupled to said signal comparison circuitry and responsive to said error signal for controlling the A.C. input power to said power circuitry and limiting circuitry coupled to said power measuring means and responsive to said output power voltage signal and to a predetermined threshold voltage for overriding the error signal of said comparison circuitry and for controlling said A.C. power controlling means whenever said output power voltage signal exceeds said threshold voltage.

2. The power supply claimed in claim 1 wherein said A.C. power controlling means includes a pass element responsive to said error signal, and further includes saturable reactors in said power circuitry A.C. input circuitry, said pass element controlling a D.C. saturation current in said reactors.

3. The power supply claimed in claim 1 wherein said limiting circuitry includes an operational amplifier and a reverse biased diode coupled between the output terminal of said amplifier and the input to said A.C. power controlling means, said diode decoupling said amplifier from said power controlling means at input levels below said threshold level.

4. The power supply claimed in claim 1 wherein said power measuring means includes a first scaling amplifier for generating a first voltage signal proportional to the output voltage of said power supply, a second scaling amplifier for generating a second voltage signal proportional to the total output current of said supply, and a product multiplier coupled to said first and said second scaling amplifiers for generating a volt-ampere product signal of said voltage and current signals.

5. The power supply claimed in claim 4 wherein said limiting circuitry is coupled to said multiplier for generating an overriding output signal whenever said volt-ampere product signal exceeds said threshold voltage.

6. The power supply claimed in claim 4 wherein said limiting circuitry is coupled to said first scaling amplifier for generating an overriding output signal whenever said first voltage signal exceeds said threshold voltage.

7. The power supply claimed in claim 4 wherein said limiting circuitry is coupled to said second scaling amplifier for generating an overriding output signal whenever said second voltage signal exceeds said threshold voltage.

8. The power supply claimed in claim 4 wherein said limiting circuitry is selectively coupled to the output terminals of said first scaling amplifier, said second scaling amplifier, and said product multiplier.

9. The power supply claimed in claim 4 further including first logic circuitry coupled to the output terminals of said first and second scaling amplifiers for generating a first alarm signal whenever the output of said first scaling amplifier drops to a zero output level, and a second alarm signal whenever the output of said second scaling amplifier drops to a zero output level.

10. The power supply claimed in claim 9 further including second logic circuitry coupled to said first logic circuitry, to said product multiplier and responsive to said control input signal for generating a third alarm signal whenever the power output of said power supply fails to conform with said control input signal.

11. In a power supply for generating a constant regulated power output at a level proportional to the level of an applied input control signal, including power circuitry comprising A.C. power input circuitry, retification circuitry and D.C. power output circuitry, the improvement comprising:

circuitry for measuring the voltage at the power output and generating a first signal proportional to said voltage, circuitry for measuring the current at said power output and generating a second signal proportional to said current, circuitry for producing a third signal proportional to the combined product of said first and second signals, control input circuitry responsive to said applied input control signal and providing a control signal whose level is proportional to the desired level of power output, signal comparison circuitry coupled to said circuitry for producing said third signal and also coupled to said control input circuitry for providing an error signal proportional to the difference between said third signal and said control level signal, A.C. power controlling means coupled to said signal comparison circuitry and responsive to said error signal for controlling the A.C. input power to said power circuitry, and limiting circuitry coupled between said signal comparison circuitry and said A.C. power controlling means and responsive to said first signal, second signal, and third signal for overriding the error signal of said comparison circuitry and controlling said A.C. power controlling means whenever any of the first, second or third signals differs from a predetermined level.

* * * * *

UNITED STATES PATENT AND TRADEMARK OFFICE

CERTIFICATE OF CORRECTION

PATENT NO. : 4,276,591

DATED : June 30, 1981

INVENTOR(S) : Donald L. Quick

It is certified that error appears in the above—identified patent and that said Letters Patent is hereby corrected as shown below:

Column 5, line 28, "indicates" should read -- includes --.

Signed and Sealed this

*Twenty-fourth* Day of *November 1981*

[SEAL]

*Attest:*

GERALD J. MOSSINGHOFF

*Attesting Officer* *Commissioner of Patents and Trademarks*